United States Patent
Brewer

(10) Patent No.: US 7,991,418 B2
(45) Date of Patent: Aug. 2, 2011

(54) METHOD AND APPARATUS FOR RETRIEVING DATA FROM ONE OR MORE WIRELESS COMMUNICATION DEVICES

(75) Inventor: Beth Ann Brewer, Canyon Lake, TX (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 12/110,988

(22) Filed: Apr. 28, 2008

(65) Prior Publication Data

US 2009/0325620 A1    Dec. 31, 2009

(51) Int. Cl.
*H04B 7/00* (2006.01)
(52) U.S. Cl. .......... 455/518; 455/519; 455/412.1; 455/412.2; 455/414.2
(58) Field of Classification Search .......... 455/518, 455/519, 3.05, 412.1, 414.1, 425, 517, 3.06, 455/552.1, 553.1, 412.2, 414.2; 340/539.13; 370/254, 328
See application file for complete search history.

(56) References Cited

U.S. PATENT DOCUMENTS

| 2006/0023642 A1* | 2/2006 | Roskowski et al. .......... 370/254 |
| 2006/0111134 A1* | 5/2006 | Mills .......... 455/518 |
| 2008/0186162 A1* | 8/2008 | Rajan et al. .......... 340/539.13 |

FOREIGN PATENT DOCUMENTS

| EP | 1304894 | 4/2003 |
| EP | 1708455 | 10/2006 |
| JP | EP1304894 | * 10/2002 |

OTHER PUBLICATIONS

International Search Report, PCT/US2009/040230, International Searching Authority, European Patent Office, Aug. 6, 2009.
Written Opinion, PCT/US2009/040230, International Searching Authority, European Patent Office, Aug. 6, 2009.

* cited by examiner

*Primary Examiner* — Tan Trinh
(74) *Attorney, Agent, or Firm* — Raphael Freiwirth

(57) ABSTRACT

A system, method, and apparatus that retrieve data from one or more wireless communication devices that are at least members of a communication group without user intervention are disclosed. In one embodiment, a request for data is sent to an intermediate device, which forwards the request to a target wireless device. The target wireless device determines if the request is allowed and preferably responds with the requested data or a failure notice. The location of the requested data may be known to the requesting device and included in the request, or it may be known to the target wireless device, which locates the data upon receiving the request. In another embodiment the requesting device and the target wireless device directly communicate without the intervention of an intermediate device. The data requested can help the requesting device or its user determine if and when to initiate group communications.

23 Claims, 5 Drawing Sheets

METHOD AND APPARATUS FOR RETRIEVING DATA FROM ONE OR MORE WIRELESS COMMUNICATION DEVICES

BACKGROUND OF THE INVENTION

1. Field of the Invention

The present invention relates to point-to-point or point-to-multipoint wireless communications systems. More specifically, the present invention relates to a method, system, and apparatus for retrieving well known or arbitrary data from one or more wireless devices that are members of a communication group, such as push-to-talk (PTT) communication group.

2. Description of the Related Art

In cellular wireless telecommunications, there have been several standards implemented regarding the creation and functionality of the communication infrastructure, such as EVDO, GSM, UMTS, and AMPS. One of the more recent standards is CDMA2000, where CDMA is an abbreviation for "code division multiple access." CDMA2000 supports a Broadcast-Multicast Service (BCMCS), which allows optimization of the radio interface for delivery of BCMCS content stream(s) to one or more wireless communication devices in one or more regions of an cellular carrier's network. The CDMA2000 protocol allows for both voice and data to be transmitted to and from wireless communication devices and determines the appropriate resource allocation for communications, both to and from the wireless telecommunication device and the radio access network (RAN), and in between communication control devices, such as base stations, packet data serving nodes (PDSN), and broadcast serving nodes (BSN).

There exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions. In some arrangements, the PTT speaker will have the "floor" where no other group member can speak while the speaker had engaged the PTT button at his or her device. Once the speaker releases the PTT button, any other individual member of the group can engage their PTT button and they will have the floor.

PTT currently offers the ability to unilaterally send information and data to other members of a PTT group. To retrieve information, however, a request is sent to a device member of the PTT group, the target device, and the user of the target device must then take some action to respond with the requested information. This process is often accomplished by exchanging text messages. This requires an extra step by the user of the target device, which in turn lengthens the response time and delay for the requesting member. Accordingly, it would be advantageous to provide a method, system, and apparatus that allows the retrieval of information from a device that is a member of a PTT group without intervention on behalf of the target user Such a method and apparatus would allow the quick retrieval of information from members of a PTT group that would facilitate setting up and maintaining group communications. It is thus to the provision of such a method, system, and apparatus for retrieving well known or arbitrary data from one or more wireless devices that are members of a communication group that the present invention is primarily directed.

SUMMARY OF THE INVENTION

The present invention includes a system, method, and apparatus for retrieving data from a wireless device that is a member of a communication group. In one embodiment, a requesting wireless device transmits a data retrieval request to a target wireless device. The target wireless device then responds with the requested data. The target wireless device may have data retrieval restrictions which it uses to evaluate the data retrieval request. If the request is not allowed under the data retrieval restrictions, the target wireless device transmits a failure notice to the requesting wireless device. If the request is allowed, the target wireless device transmits the requested data to the requesting wireless device. The data retrieval request may specify the location, type, or other information about the data requested, or the target device may locate the data upon receiving the request. Likewise, the requesting wireless device can send its data that corresponds to the data requested from the target wireless device.

In another embodiment, there is an intermediate device which facilitates communication between the requesting wireless device and the target wireless device. The intermediate device may receive the data retrieval request from the requesting wireless device, perform actions required to locate the target wireless device and place the request in a form that ensures successful delivery of the request, and then transmit the data retrieval request to the target wireless device. The intermediate device may also perform a check against data retrieval restrictions, and if the request is not allowed under the data retrieval restrictions, the intermediate device may transmit a failure notice to the requesting wireless device. If the request is allowed, the target wireless device may then respond to the request, either with the requested data or with a failure notice, transmitting the response to the intermediate device. The intermediate device may then transmit the response to the requesting wireless device, performing further actions such as locating the requesting wireless device and placing the response in a form that ensures successful delivery of the response as desired or necessary.

In another embodiment, all the actions performed by the target wireless device are performed without the intervention of the target wireless device user. In yet another embodiment, the data requested by the requesting wireless device may not be present on the target wireless device, but the target wireless device may have means to obtain the data. In this embodiment, the target wireless device, upon receipt of the data retrieval request, locates and acquires the requested data from another computing device external to the target wireless device, and responds with the acquired data.

The present system, method, and apparatus are therefore advantageous in that they allow the retrieval of information from a target wireless device that is a member of a communication group without intervention by the user of the target wireless device. This facilitates the coordination of group communications, and allows the status of group communication members to be obtained without requiring extra steps or activities by the members. Thus, the present system, method, and apparatus can save time for members of group communications and increase the efficiency of such communications.

Other objects, features, and advantages of the present invention will become apparent after review of the Brief Description of the Drawings, Detailed Description, and the Claims.

DETAILED DESCRIPTION

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

Furthermore, the system is shown in several embodiments here as operating in a CDMA2000 network architecture. Reference can be had to the known standards and construction of CDMA2000 systems and network interfaces as would be known to one of skill in the art. Other standards can likewise be configured to implement the system and method shown herein.

Figure 1:
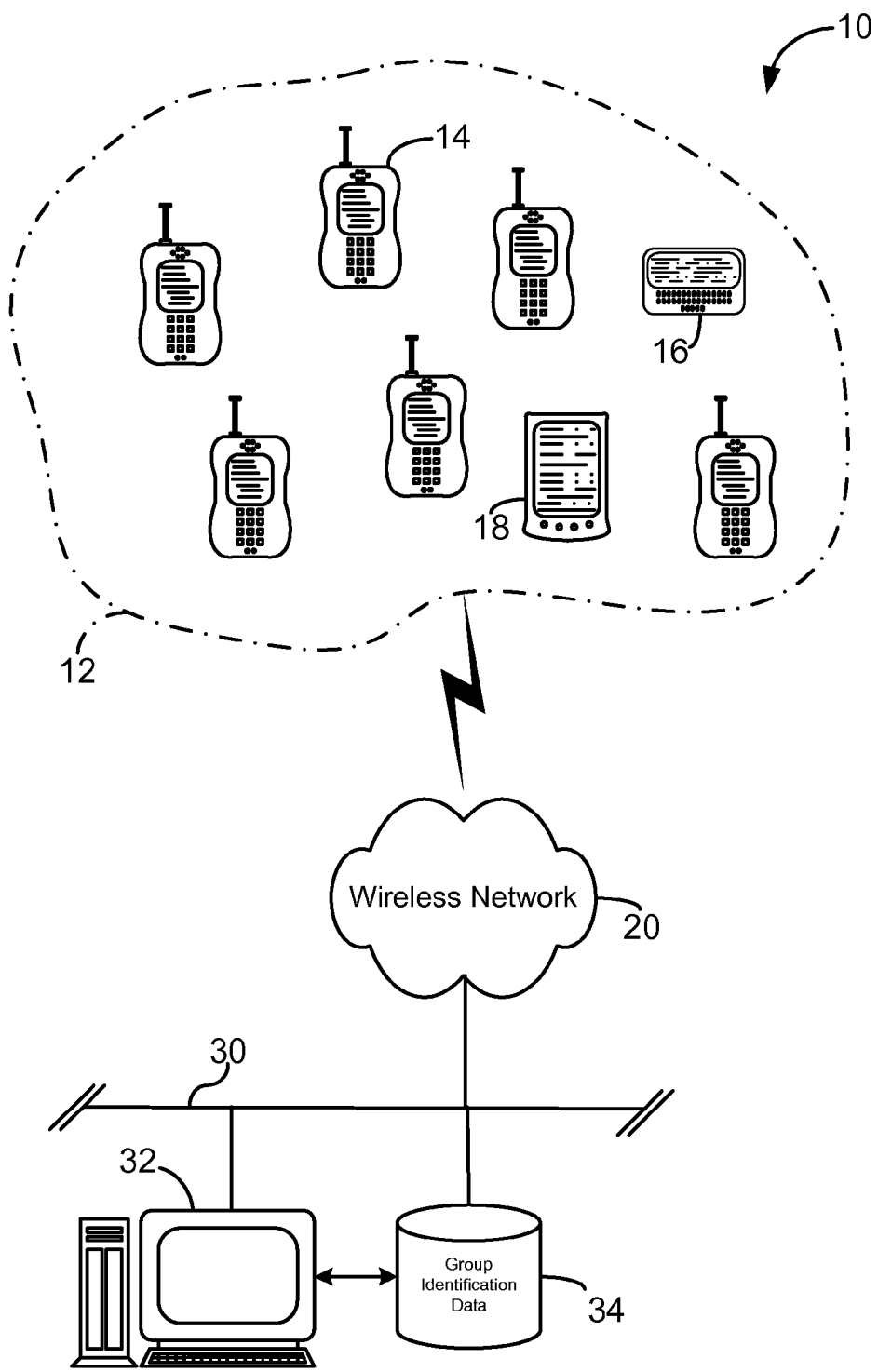
FIG. 1 is a representative diagram of one embodiment of a wireless network with a designated PTT group of wireless telecommunication devices communicating with a group communication server and other computer devices across the wireless network

With reference to the figures in which like numerals represent like elements throughout, FIG. 1 illustrates one embodiment of a system 10 with a group communication server 32 and one or more wireless telecommunication devices in a communication group 12, such as wireless telephone 14, smart pager 16, and personal digital assistant (PDA) 18, that communicate with other wireless telecommunication devices across a wireless network 20. In the system 10, each wireless telecommunication device 14, 16, 18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) sends a flag to at least the group communication computer device, shown here as group communication server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share the information with other computer devices resident on the server-side LAN 30 or accessible across the wireless network 20. The group communication computer device 32 can have an attached or accessible database 34 to store the group identification data for the wireless devices. It should be appreciated that the number of computer components resident on server-side LAN 30, or across the wireless network 20, or Internet generally, is not limited.

The direct communication, such as a PTT communication, can be established through a half-duplex channel between the communicating wireless telecommunication device 14, 16, 18 and the one or more other wireless telecommunication devices of the target set. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14, 16, 18 of the inability to bridge a direct communication to the target set 12 upon none of the wireless telecommunication devices of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein.

In overview, the system 10 selectively communicates to a wireless communication device 14,16,18 for a group communication across the wireless communication network 20 with the group communication server 32 configured to receive a request to establish a group communication with at least one target wireless communication device (e.g. mobile telephone 14), and the group communication server 32 sends a request to at least one target wireless communication device across the wireless communication network 20 indicating an incoming group communication.

The group communication can be voice, data applications, graphic media, such as pictures in JPEG, TIF, and the like, or audio files such as MP3, MP4, WAV, and the like. The media can also be video or streaming media, such as a multimedia application (PowerPoint, MOV file, and the like). Also, the group communication is typically half-duplex audio conferencing among members of the communication group 12.

Figure 2:
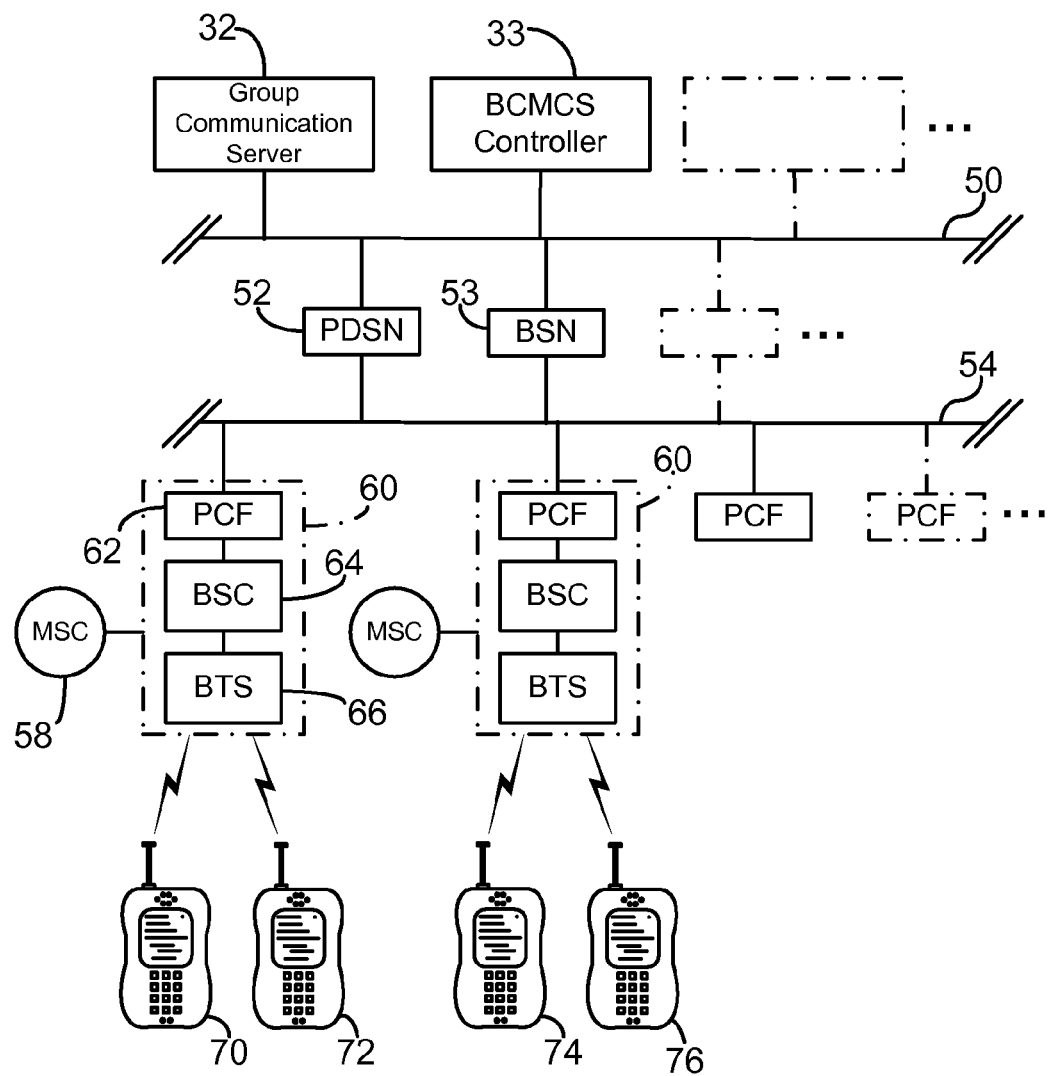
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices, such as group communication server 32 that controls communications between the wireless communication devices of set group members (devices 70, 72, 74, 76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option. Also shown on LAN 50 is a BCMCS Controller 33, the functionality of which is more fully set forth below in FIGS. 4 and 5.

The group communication server 32 is connected to a wireless service providers packet data service node (PDSN)

such as PSDN 52, and/or a broadcast serving node 53 shown here resident as on a carrier network 54. Each PSDN 52 or BSN 53 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the base transceiver station (sometimes referred to as "branch-to-source") (BTS) 66 by both the network and/or Internet for data transfer and POTS for voice information. The BTS 66 ultimately broadcasts and receives messages wirelessly to and from the wireless devices, such as cellular telephones 70, 72, 74, 76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such group-direct communications may occur through, or be at the control of, the group communication server 32. All data packets of the devices do not necessarily have to travel through the group communication computer device 32 itself, but the group communication computer device 32 may be able to ultimately control the communication because it will typically be the only server-side 30 component that is aware of and/or can retrieve the identity of the members of the communication group, or direct the identity of the members of the communication group 12 to another computer device.

Figure 3:
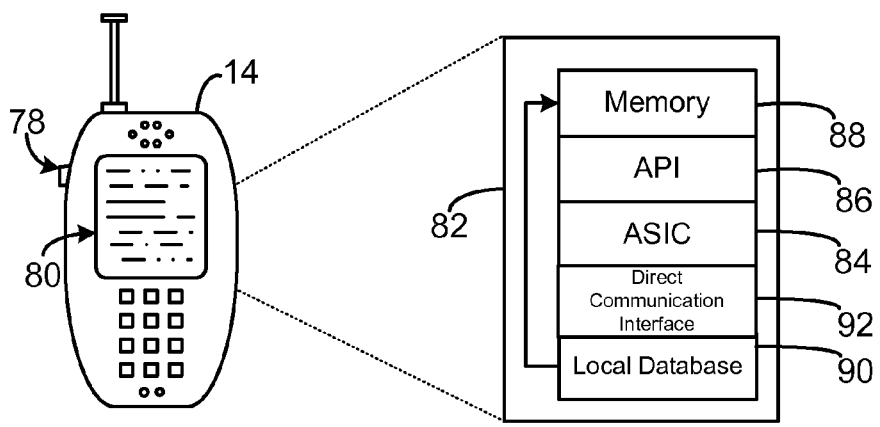
FIG. 3 is a block diagram illustrating the computer platform of the wireless telecommunication device embodied with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group communications. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and may not normally be upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 26, or even a separate computer platform, such as a laptop or desktop, that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk.

In this embodiment of the wireless device, the computer platform 82 also includes a direct communication interface 92 that can open the direct communication channel from the wireless device, typically for the half-duplex voice communication in a PTT call. The direct communication interface 92 may also be part of the standard communication interface for the wireless device which ordinarily carries the voice and data transmitted to and from the wireless device. The direct communication interface 92 typically is comprised of hardware as is known in the art.

Figure 4:
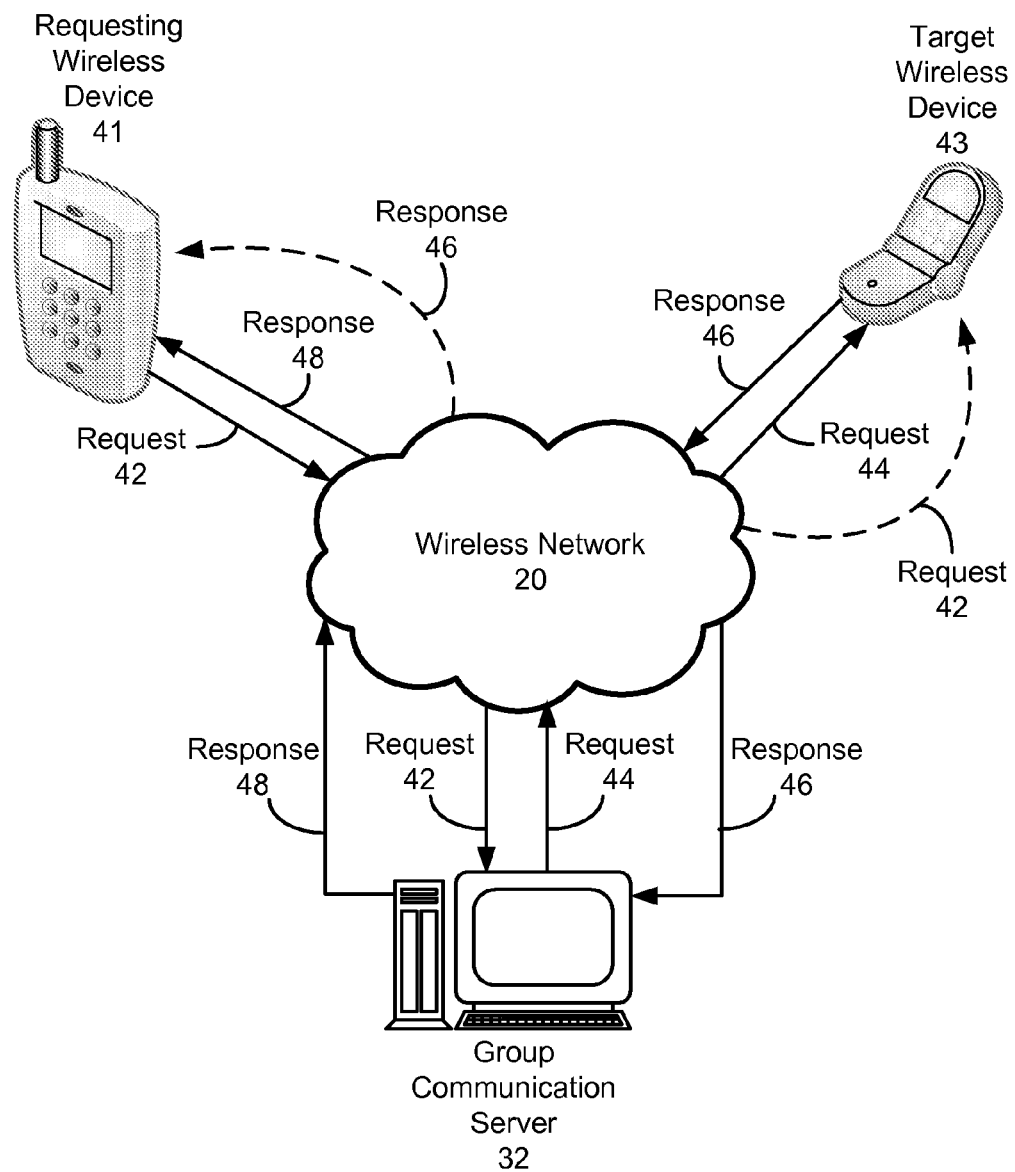
FIG. 4 is a block diagram illustrating an exemplary, non-limiting embodiment of a system for retrieving data from a wireless device.

FIG. 4 is a block diagram illustrating one non-limiting, exemplary embodiment of a system for retrieving data from one or more wireless devices. In this embodiment, a data retrieval request is sent from requesting wireless device 41 to target wireless device 43. Requesting wireless device 41 and target wireless device 43 may be wireless devices such as wireless telephone 14, pager 16, PDA 18, or any other device capable of sending requests for data and participating in group communications such as PTT. Requesting wireless device 41 and target wireless device 43 communicate with each other and with other wireless devices through wireless network 20. Group communication server 32 may also be connected to wireless network 20, either directly or indirectly through a series of network devices and other computing devices, to facilitate group communications, as described herein with regard to FIG. 1.

While FIG. 4 illustrates a single requesting wireless device and a single target wireless device, it should be appreciated that a data retrieval request may be sent from a requesting wireless device to multiple target wireless devices. The request may include the addresses of multiple individual wireless devices, or it may include a single or multiple communication group identifiers, which correspond to several wireless devices. A duplication of the request containing communication group identifiers may be made by an intermediate device, such as group communication server 32, where each duplicate request has an individual target wireless device address in place of communication group identifiers. Other means and methods of transmitting a request to multiple target wireless devices, including using multicast, are known to those skilled in the art and contemplated as within the scope of the present subject matter.

In this embodiment, requesting wireless device 41 generates a request 42 requesting data from target wireless device 43. The requested data may be of any type available on or via the target wireless device, including global positioning system (GPS) coordinates, use status of the target device (currently in use for a voice call, Internet access, text messaging, etc.), and device status (device is set to be on silent mode, device has messaging or PTT disabled, etc.) It is contemplated that data on target wireless device 43 may be useful in group communications, and by obtaining such data from target wireless devices without target device user intervention, a user or requesting device may be able to determine the optimal times and most appropriate usage for group communications. For example, by using acquired data, a communication group member can determine, before initiating a group communication transmission, whether the relevant members of the group are available and able to receive the communication. The acquired data may also selectively permit the group communication to proceed. For example, if the data acquired indicates that a group member is not available, the transmission of group communication may be disabled on requesting wireless device 41 until the member is available. Alternatively, the group communication may be permitted, but receipt of the communication by the unavailable member will be disabled until the member is again available.

It is also contemplated that request 42 may request data that is not contained within target wireless device 43, which may result in target wireless device 43 communicating with another device to obtain the requested data. For example, target wireless device 43 may have Internet access capabilities that are not available on requesting wireless device 41. Request 42 may include a request for data available on the Internet. Therefore, in order to obtain such data, requesting wireless device 41 sends request 42 to target wireless device 43, which in turn obtains the requested data from the Internet, and responds to requesting wireless device 41 with the data.

Request 42 may include the target wireless device 43 address, the requested data type, or an application identifier identifying the application on target wireless device 43 that can locate the requested data. The request may include any other information necessary to locate the requested data on target wireless device 43, or target wireless device 43 may be responsible for locating the data. Alternatively, request 42 may not specify the application, and target wireless device 43 may be able to determine which application can access the requested data. In another alternative, request 42 may contain the addresses of several devices, which may be devices in a communications group. In yet another alternative, request 42 may contain a communication group identifier, which will result in the request being forwarded to all devices associated with the identified communication group, such as communication group 12, described herein in reference to FIG. 1. Various other data and contents of the request are contemplated as within the scope of the present disclosure, including any data or information that may assist or direct target wireless device 43 or group communication server 32 in locating the requested data.

Request 42 is transmitted first to wireless network 20, where it may then be delivered to group communication server 32. Group communication server 32 then performs any manipulation or alteration of request 42 required or desired for successful implementation of the present subject matter, discussed herein with reference to FIG. 5, and transmits the possibly modified request in the form of request 44 to target wireless device 43 over wireless network 20. Target wireless device 43 receives request 44, evaluates the message and locates the requested data, discussed herein with reference to FIG. 6, and transmits response 46 to group communication server 32 over wireless network 20. This may be performed entirely by the device without intervention by the device's user. Upon receiving response 46, group communication server 32 performs any manipulation or alteration of response 46 required or desired, discussed in more detail herein with reference to FIG. 5, and transmits the possibly modified response in the form of response 48 to target wireless device 43 over wireless network 20. Requesting wireless device 41 then receives response 48, completing the process.

As technology advances and wireless devices become more powerful and capable, the intervention of intermediate servers to facilitate group communications may not be necessary. Referring again to FIG. 4, where dashed lines represent direct communications between wireless devices over wireless network 20, the present subject matter may be implemented such that an intermediate server, such as group communication server 32, is not required. Request 42 may be received by target wireless device 43 directly from requesting wireless device 41 over wireless network 20 without the intervention of group communication server 32. The request may be evaluated as described herein, and response 46, which may be a failure notice or may include the requested data, is automatically generated. The term "automatically" as used herein is specifically intended to encompass functions and functionality that does not require and user action or intervention to allow the function. Response 46 may then be sent directly to requesting wireless device 41 from target wireless device 43 over wireless network 20 without the intervention of group communication server 32.

Figure 5:
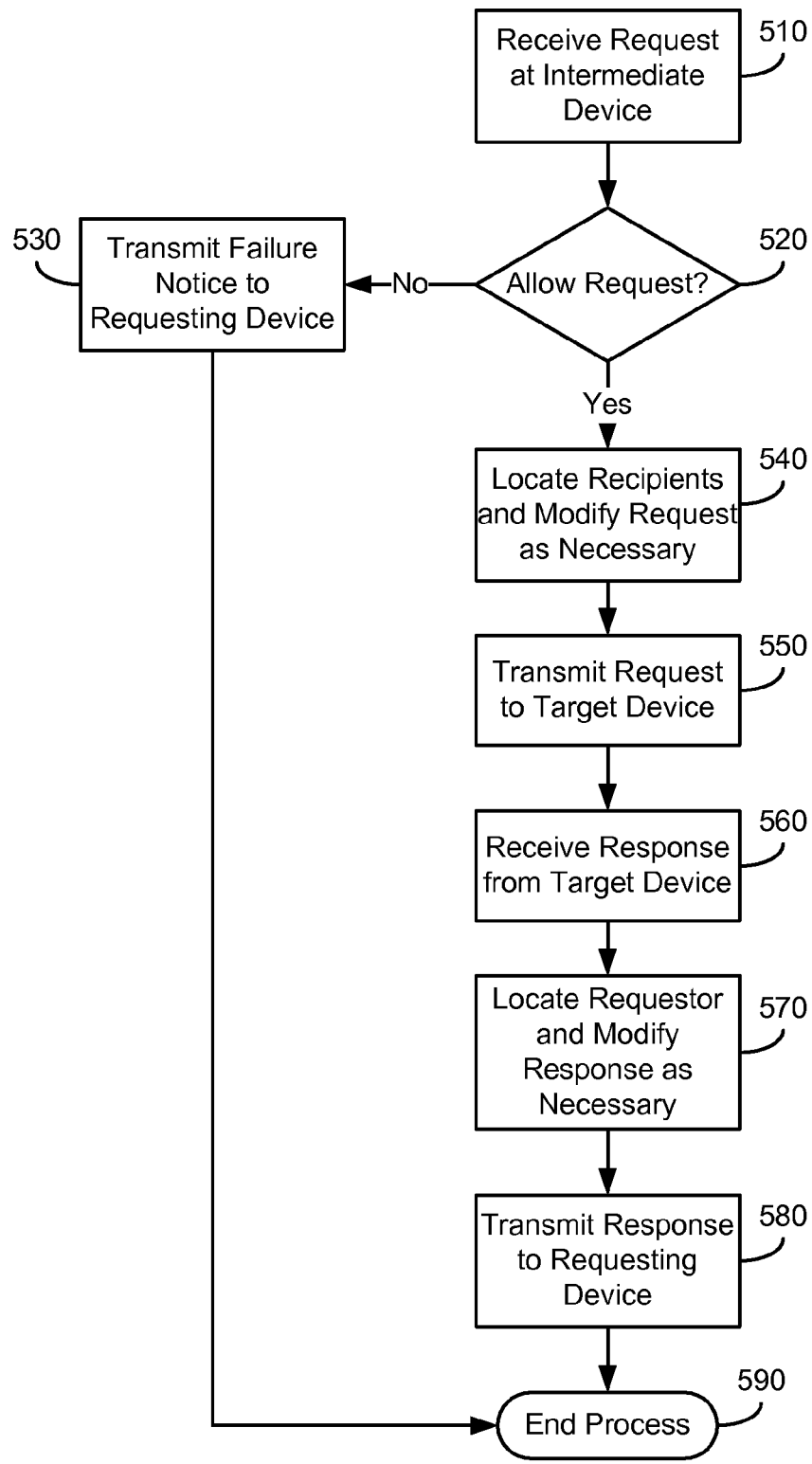
FIG. 5 is a flow diagram illustrating an exemplary, non-limiting method of retrieving data from a wireless device using an intermediate device.

FIG. 5 illustrates a flow diagram of one exemplary, non-limiting embodiment of the present subject matter as implemented on an intermediate computer device such as group communication server 32. The request for data is received by the intermediate device at block 510. The intermediate device may simply forward requests to target devices, or it may have restrictions and requirements regarding requests for data, and may reject or accept requests based on such requirements. For example, referring again to FIG. 4, group communication server 32 may require that requests are in a certain format, or contain certain data identifying the requesting device. The intermediate device may also perform data retrieval restriction checks on behalf of target devices. For example, a target device may not allow data retrieval requests from devices that are not within its communications group. The intermediate device receiving such requests may perform a check against a target device's data retrieval restrictions before forwarding the request to the target device. Other requirements and restrictions are contemplated as within the scope of the present disclosure. At block 520, the intermediate device determines if the request is allowed. If the request is not allowed, at block 530 the intermediate device transmits a failure notice to the requesting device, and the process is complete at block 590.

If at block 520 the intermediate device receiving the request determines that the request is allowed, then at block 540, the intermediate device may evaluate the request, and determine which devices are the intended recipients. Once the intended recipients are determined, the intermediate device may then locate the target devices using wireless network technologies known to those skilled in the art. The intermediate device may also modify the request, or create a new request, before transmitting the request to the intended recipients. The requests may be essentially identical to the request received from a requesting device, or they may be altered as necessary or desired. For example, referring again to FIG. 4, if request 42 from requesting wireless device 41 contains only a communication group identifier and no individual device addresses, group communication server 32 may alter the request to include individual device addresses. Alternatively, the intermediate device may generate a new request for each target device, containing the relevant contents of the data request from the received request along with the individual address of target devices. Other modifications of received requests are contemplated as within the scope of the present disclosure.

Once a target device is located, the intermediate device may transmit the request to the target device over a wireless network at block 550. The transmitted request contains the request for data included in the request received at block 510, modified as necessary at block 540 to successfully be received by the target device. The target device will then evaluate the request and respond, which will be described in more detail herein with reference to FIG. 6. At block 560, the intermediate device receives the response from the target device.

At block 570, the response received at block 560 is modified as necessary to enable the relevant data within the response to be transmitted successfully to the requesting device. Like the initially received request, such modifications may include address translation or determination, as well as any other necessary or desired modifications that may help ensure the successful implementation of the present subject matter. Alternatively, a new and distinct response may be created which includes the relevant response data from the response received at block 560. If necessary, the requesting device is also located. Following any modification of the response, or creation of a new response, and locating the requesting device, the response is transmitted to the requesting device at block 580. The process is then complete at block 590.

Figure 6:
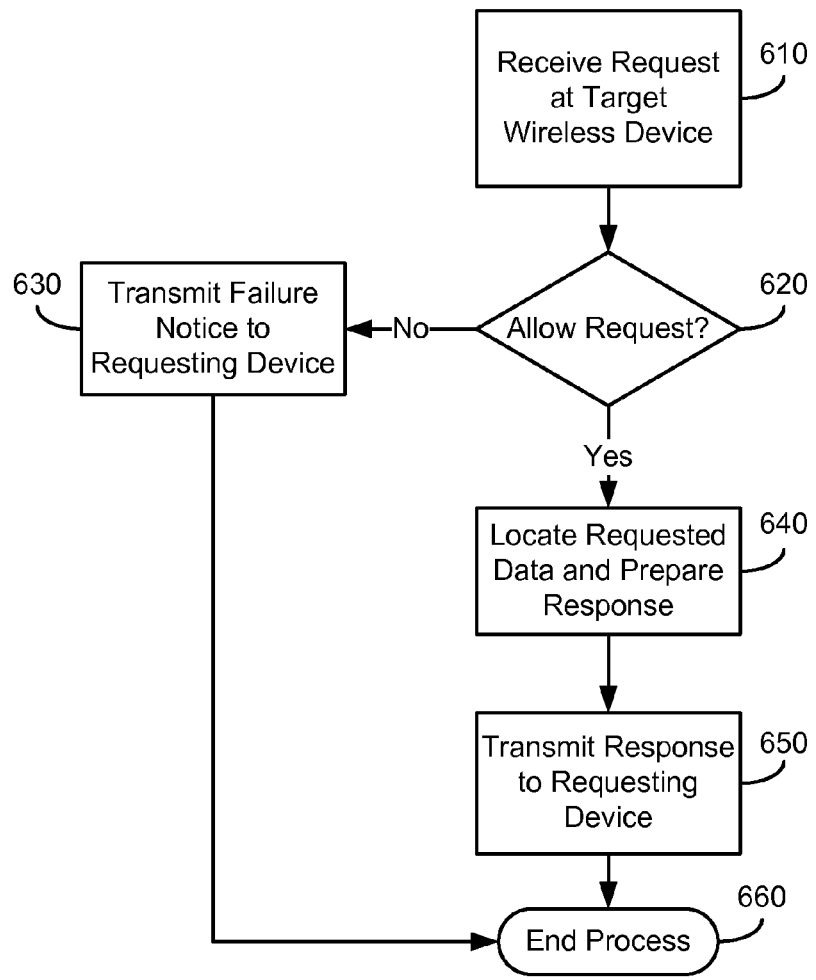
FIG. 6 is a flow diagram illustrating an exemplary, non-limiting method of retrieving data from a wireless device as performed on a target wireless device.

FIG. 6 illustrates a flow diagram of one exemplary, non-limiting embodiment of the present subject matter as implemented on a target device, such as target wireless device 43 in FIG. 4. The target device may evaluate a received data retrieval request to determine the type and content of the response that will be sent. The target device receives a data retrieval request at block 610. The target device may be configured with data retrieval restrictions which allow the target device to deny or allow requests based on predefined criteria. For example, the target device may permit data retrieval only by members of a communications group in which the target device is currently a member. Alternatively, the target device may permit retrieval of only specified types of data, or retrieval of data from only specified applications. In yet another alternative, the target device may only permit retrieval of data based on requests received from a specific server, such as group communication server 32 in FIG. 4, and not permit retrieval of data based on requests received directly from other wireless devices. It should be appreciated that many other possible restrictions on data retrieval are possible and may be desirable, and all such restriction schemes are contemplated as within the scope of the present disclosure.

The target device determines if a received request is allowed at block 620, and, if not, the target device transmits a failure notice to the requesting device. This may be accomplished automatically, without intervention by the device user. The failure notice may be transmitted to an intermediate device, such as group communication server 32, for relaying to the requesting device, or it may be transmitted directly to the requesting device without the intervention of an intermediate device. If a failure notice is transmitted, the process is complete at block 660.

If at block 620 the target device determines that the request is allowed, then at block 640 the target device locates the requested data, possibly using the contents of the request to aid in data location as discussed herein with reference to request 42 in FIG. 4, and constructs a response with the requested data included. At block 650, the target device transmits the response to the requesting device, either transmitting the response to an intermediate device for relaying to the requesting device, or transmitting the response directly to the requesting device. Both the locating of the requested data and the transmission of the response may be accomplished automatically, without intervention by the target device user. The process is then complete at block 660.

In view of the methods being executable on a mobile device and other computer platforms, the method can accordingly be performed by a program resident in a computer readable medium, where the program directs the mobile device or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:
1. A method of retrieving data from a target wireless device that is a member of a communication group, comprising:
sending a data retrieval request from a requesting wireless device requesting data from a target wireless device to a first intermediate computer device, wherein:

the first intermediate computer device evaluates data retrieval restrictions to determine if the data retrieval request is allowed and if the data retrieval request is allowed, sends the data retrieval request to the target wireless device; and if the data retrieval request is not allowed, the first intermediate device transmits a failure notice to the requesting wireless device; and receiving at least a response from the target wireless device.

2. The method of claim 1, wherein the response received from the target wireless device comprises the requested data.

3. The method of claim 1, wherein the response received from the target wireless device comprises a failure notice.

4. The method of claim 1, wherein the data retrieval request comprises at least one of a target wireless device address, a communication group identifier, a data type, and an application identifier.

5. The method of claim 1, wherein data retrieval request causes the target wireless device to communicate with a second intermediate computer device.

6. A method of providing, at an intermediate computer device, requested data from a target wireless device of a communication group to a requesting computer device member of the communication group, comprising:

receiving a request for data from the requesting computer device;

evaluating data retrieval restrictions to determine if the request for data is allowed and if the data retrieval request is allowed, automatically transmitting a response to the requesting computer device based on the data requested from the target wireless device; and if the request for data is not allowed, transmitting a failure notice to the requesting computer device.

7. The method of claim 6, wherein the request for data contains a group identifier, and wherein the intermediate computer device determines an address of the target wireless device based upon the group identifier.

8. The method of claim 6, wherein the requesting computer device is a wireless device.

9. A method of obtaining a status of a target wireless device member of a communication group, comprising:

sending a first data retrieval request requesting status data from a target wireless device to a group communication computer device, wherein the group communication computer device locates the target wireless device, evaluates data retrieval restrictions to determine if the status data request is allowed and, if the status data request is allowed, transmits a second data retrieval request to the target wireless device, and if the status data request is not allowed, the group communication computer device transmits a failure notice in response to the first data retrieval request; and if the status data request is allowed, receiving a response from the target wireless device, including data indicating at least the status thereof; and selectively permitting a group communication to the target wireless device based upon the status of the target wireless device.

10. The method of claim 9, wherein the first data retrieval request is a request to initiate a group communication session.

11. The method of claim 9, wherein the second request is a request to initiate a group communication session.

12. The method of claim 9, wherein a location of the status data is known at an application on the target wireless device and provided by the application to the target wireless device.

13. The method of claim 9, wherein the location of the status data is included in the first and second data retrieval requests.

14. A computer-readable product, comprising:

a computer-readable medium, comprising:

a set of instructions to evaluate data retrieval restrictions to determine if a data retrieval request requesting data from at least one target wireless device of a communication group is allowed and if the data retrieval request is allowed, sending the data retrieval request to the at least one target wireless device, wherein the at least one target wireless device is configured to respond to the data retrieval request without user intervention;

a set of instructions to, if the data retrieval request is not allowed, transmit a failure notice in response to the data retrieval request; and a set of instructions to receive a response from the target wireless device.

15. The computer-readable product of claim 14, wherein the set of instructions to transmit the data retrieval request requesting data from at least one target wireless device further comprises a set of instructions to include in the data retrieval request at least one of a target wireless device address, a communication group identifier, a data type, and an application identifier.

16. The computer-readable product of claim 14, further comprising:

a set of instructions to selectively initiate a group communication session based on the response received from the target wireless device.

17. A system for coordinating group communications among a plurality of wireless devices within a communication group, the system comprising:

an intermediate computer device;

a requesting wireless device; and a target wireless device;

wherein the requesting wireless device transmits a data retrieval request to the intermediate computer device;

wherein, after receiving the data retrieval request, the intermediate computer device makes a determination on whether the data retrieval request is allowed and if the data retrieval request is allowed, sends the data retrieval request to the target wireless device, and if the data retrieval request is not allowed, the intermediate device transmits a failure notice to the requesting wireless device; and wherein the target wireless device transmits a response to the requesting wireless device based upon the determination; and wherein, after receiving the response from the target wireless device, the requesting wireless selectively initiates a group communication to the target wireless device.

18. The system of claim 17, wherein the transmitted response indicates that the target wireless device is available for group communication.

19. A computer-readable product, comprising:

a computer-readable medium, comprising:

a set of instructions to receive a request for data at a target wireless device that is a member of a communication group from a requesting computer device member of the communication group;

a set of instructions to evaluate data retrieval restrictions to determine if the request is allowed;

a set of instructions to send the request to the target wireless device if the request is allowed; and a set of instructions to automatically transmit a response to the requesting computer device based on the request;

wherein the response comprises a failure notice if the request is not allowed and the requested data if the received request is allowed.

20. A system for transmitting data from a target wireless device that is a member of a communication group to a requesting wireless device that is a member of the communication group, the system comprising:
    means for receiving a data retrieval request from the requesting wireless device, the data retrieval request requesting data from the target wireless device;
    means for evaluating data retrieval restrictions to determine whether the data retrieval request is allowed; and
    means for transmitting a response to the data retrieval request, wherein, if the data retrieval request is allowed, at least the requested data is transmitted, and wherein, if the data retrieval request is not allowed, at least a failure notice is transmitted.

21. The system of claim 20, wherein the data retrieval request is a request for a status of the target wireless device.

22. The system of claim 20, wherein the data retrieval request is a request to initiate a group communication session.

23. A system for receiving data at a requesting wireless device that is a member of a communication group from a target wireless device that is a member of the communication group, the system comprising:
    means for transmitting a data retrieval request from the requesting wireless device to an intermediate device, the intermediate device then transmitting the data retrieval request to the target wireless device, wherein the intermediate device evaluates data retrieval restrictions to determine if the data retrieval request is allowed and if the data retrieval request is allowed, sends the data retrieval request to the target wireless device, and if the data retrieval request is not allowed, the intermediate device transmits a failure notice to the requesting wireless device; and
    means for receiving a response from the target wireless device.

* * * * *